US009589151B2

(12) United States Patent
Deleeuw et al.

(10) Patent No.: US 9,589,151 B2
(45) Date of Patent: Mar. 7, 2017

(54) TECHNIQUES AND ARCHITECTURE FOR ANONYMIZING USER DATA

(71) Applicant: INTEL CORPORATION, Santa Clara, CA (US)

(72) Inventors: William C. Deleeuw, Beaverton, OR (US); Ned M. Smith, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/369,268

(22) PCT Filed: Dec. 23, 2013

(86) PCT No.: PCT/US2013/077519
§ 371 (c)(1),
(2) Date: Jun. 27, 2014

(87) PCT Pub. No.: WO2015/099661
PCT Pub. Date: Jul. 2, 2015

(65) Prior Publication Data
US 2016/0012252 A1 Jan. 14, 2016

(51) Int. Cl.
G06F 7/04 (2006.01)
G06F 21/62 (2013.01)
H04W 4/02 (2009.01)
H04L 9/06 (2006.01)
H04L 9/08 (2006.01)
H04L 29/06 (2006.01)
G09C 1/00 (2006.01)

(52) U.S. Cl.
CPC ......... *G06F 21/6254* (2013.01); *G09C 1/00* (2013.01); *H04L 9/0656* (2013.01); *H04L 9/0869* (2013.01); *H04L 63/0421* (2013.01); *H04W 4/02* (2013.01); *G06F 2221/2111* (2013.01); *H04L 2209/42* (2013.01)

(58) Field of Classification Search
CPC ......... G06F 21/6254; G06F 2221/2107; H04L 9/0866; H04L 9/0637; H04L 9/0662; H04L 2209/34
USPC .............................. 726/26; 713/189; 380/28
See application file for complete search history.

(56) References Cited

U.S. PATENT DOCUMENTS 6,687,375 B1 * 2/2004 Matyas, Jr. ........... H04L 9/0866
380/30
2010/0199098 A1 * 8/2010 King .................. G06F 21/6254
713/182

(Continued)

OTHER PUBLICATIONS

Hamburg, Michael, "Understanding Intel's Ivy Bridge Random Number Generator", Cryptography Research, retrieved from <http://electronicdesign.com/learningresources/understanding-intels-ivy-bridge-random-number-generator>, Dec. 11, 2012, 6 pages.

(Continued)

*Primary Examiner* — Samson Lemma

(57) ABSTRACT

An apparatus may include an interface to receive a multiplicity of user information samples at a respective multiplicity of instances; a processor circuit, and an entropy multiplexer for execution on the processor circuit to generate a pseudo random number based upon a pseudo random number seed and pseudo random number algorithm for each user information sample of the multiplicity of user information samples. Other embodiments are described and claimed.

22 Claims, 11 Drawing Sheets

(56) References Cited

U.S. PATENT DOCUMENTS

| | | | |
|---|---|---|---|
| 2011/0131459 A1* | 6/2011 | Tu | G06F 11/1068 |
| | | | 714/746 |
| 2011/0179011 A1* | 7/2011 | Cardno | G06F 21/6227 |
| | | | 707/709 |
| 2012/0093312 A1* | 4/2012 | Gammel | H04L 9/0631 |
| | | | 380/255 |

OTHER PUBLICATIONS

"Psuedorandom Number Generator", Wikipedia, retrieved from <http://en.wikipedia.org/wikiPseudo_random_number_generator> on Sep. 11, 2014, (author unknown), 6 pages.

"Distributed Hash Table", Wikipedia, retrieved from <http://en.wikipedia.org/wiki/Distributed_hash_table> on Sep. 11, 2014, (Author unknown), 5 pages.

* cited by examiner

TECHNIQUES AND ARCHITECTURE FOR ANONYMIZING USER DATA

TECHNICAL FIELD

Embodiments described herein generally relate to anonymization of user data and in particular to storage and retrieval of anonymized data.

BACKGROUND

Information sharing between different parties, such as between different mobile devices, is an ever-growing need in modern computing. Information sharing between a user and a semi-trusted third party for "big data analysis" is also a growing need. Frequently, communication between mobile devices and third parties takes place through an online service provider. For example, a user of a mobile device may provide location information to a service provider in order to benefit from local traffic guidance, to keep track of children, or to help track stolen devices, for example.

These and other activities often entail provision of user data that allows their daily activities and information sources to be mined by a third party whether or not a user is aware of such third party use. For example, unscrupulous service providers may employ the collected data to increase spam based on user location. Moreover, criminals may obtain location-based data in real time to strike user homes while owners are away. As awareness of this vulnerability to data mining of user data grows, a demand for better protection of privacy and security associated with user data may increase. Although users are likely to continue to demand online convenience services, with tailored content and low cost, services that also protect privacy and security may attract more users.

It is with respect to these and other considerations that the present improvements have been needed.

DETAILED DESCRIPTION

Figure 1:
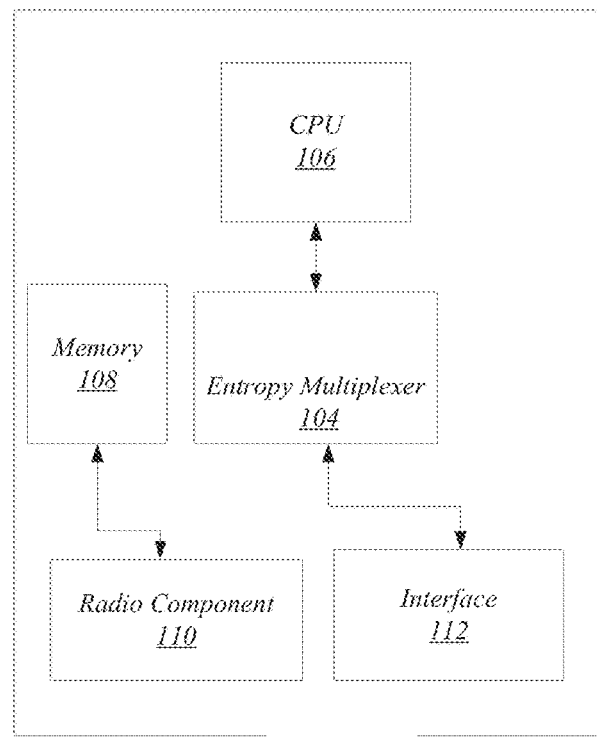
FIG. 1 depicts one exemplary architecture.
Figure 1:
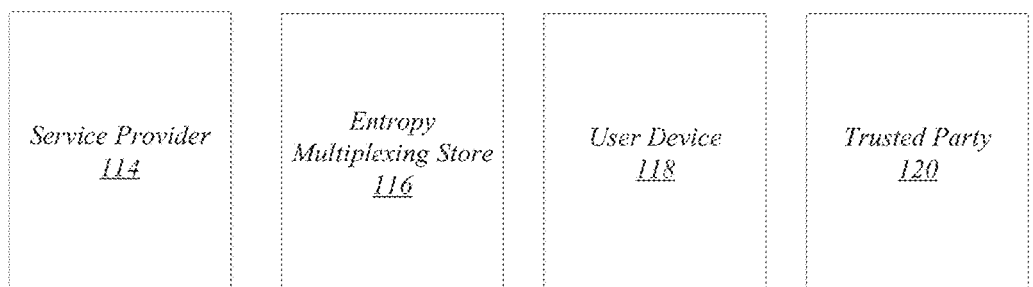

The present embodiments provide improved techniques and architecture for anonymization of user data. The embodiments disclosed herein may be used by systems to facilitate inter-device data sharing, to enable convenience services through "big data analytics," and to extend consumer control over their shared personal information. In particular, the present embodiments may be employed by services to enable selective data sharing in which safeguards are implemented to ensure only specific user data or information is available for approved analysis.

As used herein the terms "user data" and "user information" are used synonymously to denote information associated with a user device that may be recorded, provided to a third party and/or stored in one or more locations. User data may be collected with or without active participation of a user. Examples of user data collected automatically without user participation include location data that may be generated from a user's mobile device, where the location data may include a set of coordinates that specify location of the user device. As noted such location information may be used for the benefit of a user by a service provider to assist a user by providing traffic guidance, tracking children or locating stolen devices. However, user data that is not anonymized may also be employed for purposes not desired by the user.

The present embodiments facilitate greater user control of user data by providing techniques to anonymize the user data that do not require encryption. At the same time the present embodiments facilitate data analytics that are useful to the consumer and may be provided by a service provider that handles and manipulates large amounts of data in a rapid fashion. In accordance with various embodiments, using a technique that is termed herein "entropy multiplexing" (EM), user information may be "hidden in plain sight" on service provider servers or databases without encryption. In some embodiments, the EM technique is combined with Intel® Digital Random Number Generator software (Intel is a trademark of Intel Corporation) and Intel® Advanced Encryption Standard New Instructions (AESNI) to enable anonymous storage for private information with selective, and time-bounded, access control.

Various embodiments in particular allow a user to safely provide selective access to various trusted third parties or entities such as an analysis system to sequences of personal activity records of the user without the use of complex cryptography, and without providing access to unbounded data. Different levels of access may be granted to different entities without the use of complex key management, complex server security, or even specific user accounts.

As detailed below, in the present embodiments entropy multiplexing techniques and architecture are provided that allow user information to be collected and stored in a fashion that provides anonymity while allowing a service that may collect and store the user data to make use of the user information for limited purposes. At the same time entropy multiplexing allows a user to grant and control access to user information to desired entities such as trusted parties by disclosure of anonymized addresses of the user information without compromising the anonymity of the user data with respect to other parties. This provides the advantages that, in addition to immediate use, the user data can be anonymously stored for later use by the user or parties designated by the user without the need to employ a user's own resources for information.

This is accomplished by use of pseudo random number generators and distribution of random number "seeds" among parties to be granted access to user data. As detailed below, in particular embodiments the level of access control to user data may be controlled by time bounding in which a hierarchy of random number seeds are managed to allocate access to user data collected over different time periods. As used herein, the term "random number" may refer to a true random number or a pseudo random number depending upon context, and absent an explicit indication, may refer to either a true random number or pseudo random number.

In various embodiments user information is collected in a repeated fashion such as at regular sample intervals, where the user information is associated with activity of one or more user devices. In some embodiments, activity associated with a user's mobile device is collected and distributed for use by one or more parties including the user. An entropy multiplexing component may be located in a user device to control access to the user information so created. This is accomplished by associating a random number generated from a random number seed with each sample of user information collected, so that the random number serves as the address for the user information.

FIG. 1 depicts an exemplary architecture 100 for managing user information consistent with the present embodiments. In the architecture 100 a user device 102 deployed by the user may be a mobile device such as a mobile phone, smartphone, tablet computer, laptop computer or other mobile device. The embodiments are not limited in this context. The user device 102 includes a processor circuit referred to herein as CPU 106, memory 108, radio component 110, and interface 112. The user device 102 additionally includes an entropy multiplexer 104 whose operation is detailed with respect to the figures to follow. In brief, however, the entropy multiplexer 104 may generate anonymized user information by generating user information records in which a user information record includes a user information sample and pseudo random number that constitutes the address of that user information sample. The user information samples may constitute user information collected at a regular sampling interval, such as location information of the user device 102 that is collected when the user device 102 is active. Each user information sample is then paired with a pseudo random number to generate a user information record. As detailed below, the manner in which the pseudo random number addresses of the user information records are generated allows them to be stored (published) in a database operated by a service provider without compromising the anonymity of the user information records.

The entropy multiplexer 104 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

During the course of operation the user device 102 may generate user information such as location information that is associated with the user device 102. This information may be particularly useful for the user in real time, but may additionally be useful to the user and other parties at a later instance. In the architecture 100 user information associated with the user device 102 may be communicated to one or more other entities, such as a service provider 114, entropy multiplexing store 116, a user device 118, and a trusted party 120. As detailed below, the entropy multiplexing store 116 may act as a database to store multiple items of user information collected for multiple different users and anonymized using entropy multiplexing. The user information thus located in the entropy multiplexing store 116 may be stored in such a manner that user-specific information that identifies the user or certain user activity is decoupled from the stored user information. For example, various entropy multiplexing techniques may decouple user, time, and dimension information associated with collected user information when storing that user information in the entropy multiplexing store. Moreover, each user that employs EM to manage user information in the entropy multiplexing store 116 may control the type of use and the scope of information conveyed to parties granted access to the anonymized user information.

By way of illustration, in one example the user device 102 may be employed to collect location information that tracks the location of user device 102 as a function of time. This may be facilitated, for example, using the radio component 110, which may form part of the interface 112 in some embodiments. The radio component may comprise one or more radios that operate according to known techniques such as global positioning system (GPS) navigation to allow the position of user device 102 to be detected and communicated to the user device 102. In some instances, this location information may be collected as a location track that provides location of the user device 102 as a function of time. The location track may be used to inform another user device or devices such as user device 118, about recent commute activity of a user of the user device 102. While the user device 102 records a location track associated with the user device 102, this information may also be forwarded to the user device 118, which may be a home personal computer.

The user device 118 may employ a program to use this location track to anticipate the traffic that will be encountered by the user the next day or suggest a stop to refuel where gas prices are lowest. To communicate the location track between user device 102 and user device 118, the user device 102 may use an online "context service" to store location information, which is represented by the service provider 114. By virtue of operation of the entropy multiplexer 104, the operator of user device 102 may control the user location information generated by user device 102, allowing the user device 102 and user device 118 to privately service, that is, service provider 114, to analyze certain information such as evening shopping activities in order that the service provider may subsequently produce custom coupons that are valuable to the user. At the same time, the user may restrict the context service's knowledge of other user travel activity.

Turning to other uses of the entropy multiplexer 104, the user may selectively communicate user information associated with the user device 102 with a trusted party 120. The trusted party 120 may represent a friend to which the user of user device 102 may wish to communicate whereabouts, such as the location of the user during a commute home. In addition, the entropy multiplexer 104 may allow the user to prohibit personalization through location tracking of the user device 102, but may still allow location information associated with the user device 102 to be made available to a third party in an anonymous fashion. For example the user may wish to communicate anonymous commute information to a municipality to better plan for road construction. These examples illustrate the manner in which the entropy multiplexer 104 may be used to provide to different entities access to different aspects of a user's travel activity without allowing that entity to mine user information in a manner that compromises user anonymity.

This ability to control access provided by the entropy multiplexer 104 has advantages in comparison to conventional services that manage external access to location information through complex access control systems which require identification. In the conventional service scenario, a first user device and second user device may each be configured with agreed upon credentials that allows both to create or access the user location information in an unfettered manner. However, location tracks need to be encrypted in order for the user to maintain complete control over user information. Use of traditional encryption hinders sharing different time segments with different recipients by forcing knowledge before-hand of how information will be segmented and shared, or by forcing the provision/exchange of many decryption keys.

This also entails making multiple encrypted copies of user information or requires a trusted system of the user to decrypt and forward packets to chosen third parties.

Returning to FIG. 1, different advantages for managing user information by use of entropy multiplexing (EM) are provided by the architecture 100. In one scenario in which the service provider 114 employs EM, the user of the user device 102 can grant unfettered location read/write access to all of the user's trusted devices, such as user device 118. Examples of managing of access to user information for trusted devices are detailed in the FIGs. to follow. Another feature provided by EM techniques of the present embodiments, is that user information may be stored in an unencrypted fashion because the EM is not designed to disguise a given item of user information per se, but to protect the identity of the user/device that is associated with the user information, and to decouple the given item from other items of user information. This permits easy access to the user information by service provider 114, which may benefit from the user information. For example the service provider may be able to determine from recent submits to the entropy multiplexing store 116 that there are persons located at a given place, even though the identity of those persons or their travel history or future location cannot be discerned.

On the other hand, and as detailed with respect to the figures to follow, trusted devices are enabled by virtue of EM to identify which user information records in the entropy multiplexing store 116 belong to user device 102. In various embodiments, this may also be accomplished without the use of encryption. Thus, such trusted devices/parties are able to reconstruct the relationship between multiple user information records that are stored with random addresses to generate a coherent set of user information. For example, if the user of user device 102 wishes to allow a trusted party 120 access to a portion of location information of the user device 102, the user may employ EM to share a random number seed with the trusted party 120 that facilitates access to that portion of location information. Using the random number seed the trusted parties may query a database to reconstruct the user activity such as the creation of a location track of user device 102 with minimal effort. In various additional embodiments as detailed below, the user may restrict the level of access of the trusted party 120 so that only location history inside of a time bounded window is accessible.

Figure 2:
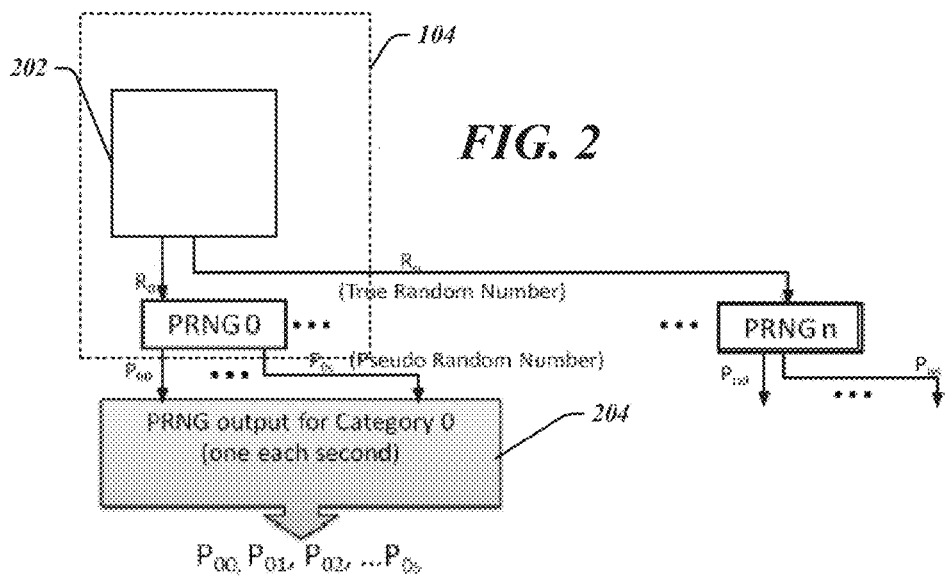
FIG. 2 shows operation of an exemplary architecture.

FIG. 2 depicts details of operation of an entropy multiplexer consistent with various embodiments. As illustrated, the entropy multiplexer 104 is configured with a random number generator 202 that is configured to generate a random number (RN) to be used for entropy multiplexing. Consistent with the present embodiments the RN generated by the entropy multiplexer 104 is employed as an address or index to be associated with user information in a manner that allows the data to be stored anonymously without encryption. In various embodiments the random number generator may be a digital random number generator such as the Intel® Digital Random Number Generator (DRNG) (Intel is a trademark of Intel corporation) or other random number generator. The embodiments are not limited in this context. In one implementation the random number RN generated by the entropy multiplexer 104 is used to represent a location category of a user device, though the RN may be used as an address for other categories of user information.

As shown in FIG. 2, the random number generator 202 may generate a series of true random numbers shown as $R_0$ to $R_N$ which are used as category seeds from which a random number series for a given category of user information may be generated. In one example, $R_0$ may represent a random number seed for a location category. In one use scenario, the entropy multiplexer 104 may be located in a user device such as a personal computer (PC), from which one or more of the RNs $R_0$ to $R_N$ and may be communicated to other user devices including mobile devices. When the random number $R_0$ is communicated to a user mobile device, for example, this may grant enduring access to read and write location information associated with the user mobile device according to entropy multiplexing. For example any user device that receives the random number $R_0$ may employ that random number to generate a pseudo random number sequence via a Pseudo Random Number Generator (PRNG) located on that user device.

As detailed below the PRNGs are used as a source of digital entropy to anonymize user information. The use of PRNGs as a source of digital entropy as provided by the present embodiments has the advantages of scalability and speed in comparison to systems based, for example, solely on true random number generators. PRNG's also provide the advantage that they produce re-creatable sequences. This allows a receiver of a seed to recreate the numbers associated with that seed in order to find the information that is otherwise hidden through the use of EM. True random numbers do not have a seed and are produced in an unpredictable and unrepeatable fashion. As discussed below, true random numbers may be employed in the present embodiments to generate the first seeds at a highest level of a category tree. However, under that level PRNGs are used to create the anonymized and recoverable addresses for user information, which cannot be accomplished using true random numbers.

In general, sampling an entropy source in TRNGs is slow compared to the computation required by a PRNG to simply calculate its next random value. For this reason, PRNGs characteristically provide far better performance than TRNGs and are more scalable.

In the illustration of FIG. 2, a PRNG0 that receives the random number $R_0$ may be located on a user mobile device or PC and may be used to generate (and regenerate) a Pseudo Random Number (PRN) sequence which constitutes the "address" of each location record.

When the user mobile device travels among different locations, the user mobile device may periodically publish a new location, which may be used to create a record of the user location. To store this location information in an anonymous fashion the PRNG0 may generate periodically a set of PRNs $P_{00}$ to $P_{0s}$ as shown. For example the set of PRNs $P_{00}$ to $P_{0s}$ may be generated once every second over a series of instances, wherein each PRN is coupled to a corresponding set of location information that includes one or more dimensions. Thus, consistent with various embodiments of the disclosure, in one example location information for a user mobile device is recorded at one second intervals, and subsequently published as a set of location records in which the location record address is specified by a corresponding PRN.

It is to be noted that the PRN in each of a set of related location records is generated based upon a procedure or algorithm implemented by the PRNG such as PRNG0. Each successive PRN is generated by operation of the algorithm on the previous PRN. In order for a trusted party to regenerate a given PRN in a sequence generated by the PRNG0, in addition to the actual algorithm employed by the PRNG0, the party may be provided with a seed used to initialize the PRNG0, as well as the number of steps taken to reach the given PRN from the PRNG0.

Thus, a PRN that is originally generated subsequently to a given PRN may be regenerated by any party or entity that employs a pseudo random number generator using the give algorithm and having the given PRN as input.

Figure 3:
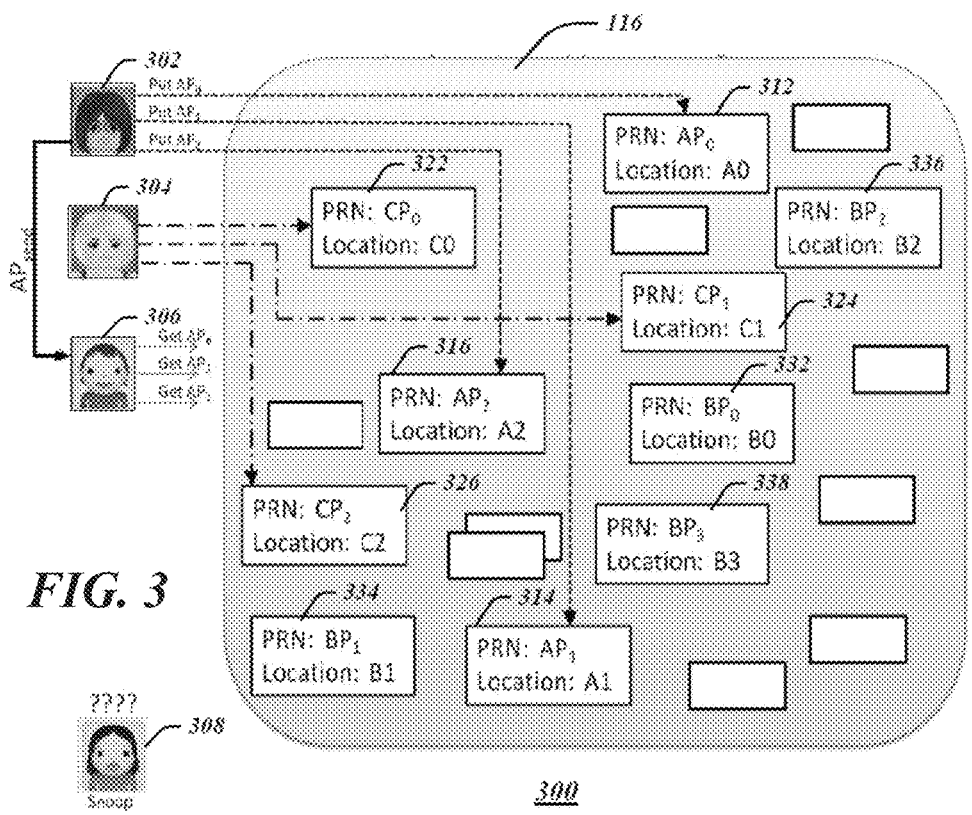
FIG. 3 depicts one exemplary implementation of entropy multiplexing.

FIG. 3 depicts an example of using EM to publish location information to an entropy multiplexing store 116 according to an embodiment of the disclosure. The architecture 300 illustrates a series of different users or entities that may have access to at least some information in the entropy multiplexing store 116. As noted, the entropy multiplexing store may be managed or owned by an entity such as the service provider 114, and user information stored therein may be used for the benefit of service provider 114 or third parties, in addition to the benefit of users that may generate the user information through various activity associated with a user device. Because EM permits user information to be stored anonymously, however, unless apprised by a user of information related to the random number seeds used to generate the location information address, an entity is prevented from associating the location information with a given user or with other location information stored in the entropy multiplexing store 116.

In the example illustrated, a user 302 publishes a series of location records 312, 314, 316 to the entropy multiplexing store 116. This may take place when a user device transmits a PRN and location message to a service provider for storage. As illustrated, each location record 312, 314, 316 includes a PRN and location. For example, location record 312 includes a PRN $AP_0$ together with location A0, location record 314 includes a PRN $AP_1$ together with location A1, and so forth. In addition, a second user 304 publishes a second set of location records 322, 324, 326, that each includes a PRN and location as shown. The entropy multiplexing store may 116 may represent one or multiple storage locations and/or storage devices, in which many location records associated with many different users are stored. As a further example, FIG. 3 depicts a series of location records 332, 334, 336, 338, which include, respectively, a PRN $BP_0$ together with location B0, PRN $BP_1$ together with location B1, a PRN $BP_2$ together with location B2, PRN $BP_3$ together with location B3. Each set of location records shown in the entropy multiplexing store 116 may thereby be made of a set of multiple location records in which the PRNs are logically related to one another. As illustrated in FIG. 3, when provided with a seed AP used to generate $AP_0$, such as $AP_1$, $AP_2$, and provided knowledge of the algorithm for generating the pseudo random numbers, a party may determine the address of location records in the entropy multiplexing store 116. For example, given the additional knowledge of the number of steps to generate $AP_0$ the trusted party 306 may regenerate that address to find the location record 312. The address of subsequent location records, that is, the derived PRNs that are derived from the PRN $AP_0$, such as $AP_1$, $AP_2$, and so forth may then be calculated to find the location records 314, 316. A user that publishes the location records or other party having such knowledge of a given pseudo random number, such as $AP_0$ may thereby access a location record associated with the given pseudo random number, or any location record generated with a PRN derived from the given pseudo random number.

Returning to FIG. 3, in one scenario it may be assumed that user 302 publishes successive location records in which a location vector for a given location record is stored in unencrypted fashion at the address dictated by the next PRN in the seeded PRNG sequence. The phone or PC of user 302 may be the sole devices that have knowledge of the seed of the PRNG used to generate the location records 312, 314, 316, so the user phone and PC alone are able to reconstruct the sequence of location record addresses that may represent the movement of user 302. Nor can other parties recognize that the location records 312, 314, 316 belong to user 302. In one scenario, the user 302 may identify an appropriate seed to trusted party 306 in order that the trusted party 306 can access the location records of user 302 in entropy multiplexing store 116. This is accomplished if the trusted party 306 employs the same PRNG as created the PRNs for location records 312, 314, 316. Thus, user 302 may also provide to the trusted third party 306 the PRNG information in addition to the PRN seed.

Provided that a large number of other people use their own RN's to represent their own location categories and store their location records in the entropy multiplexing store 116, their records serve to hide the identity of user 302, the user location records, and the user sequencing of those records. For example, the location records may be stored at random addresses in a 128-bit number field, which renders them uncorrelatable by the service provider of the entropy multiplexing store 116 or by an untrusted party 308 who doesn't have the PRN seed. In some embodiments, for additional security, the user may choose to also employ source address filtering to prevent a location tracking service from knowing which locations originated from the IP address of user 302.

Returning now to FIG. 1 to help summarize advantages provided by the scenario of FIG. 3, it can be seen that the architecture 100 may be especially useful to both service provider and individual users for scalable "big data" applications where multiple users employ the entropy multiplexing store 116 is used to store large amounts of user information. In the case where hundreds, thousands or more of users store their user information using EM, the service provider 114 is provided with a large database of useful information about user activity in the aggregate, such as location information for a large population of users. At the same time, without provision of the appropriate PRN seed from a user, the service provider 114 is not able to distinguish entries in the entropy multiplexing store 116 that belong to the user device 102 from anybody else's entries. In addition, the service provider 114 may be unsure of the order of entries for multiple user information records received from the user device 102. Instead, when interrogating entropy multiplexing store 116 for records, if the service provider encounters anonymized user information associated with user device 102, the service provider 114 may be able to discern that some user of the system is present at a location specified by the anonymized user information, but not the identity of the user device. Nor may the service provider 114 be able to discern what the location path traveled by the user device 102 has been. When the user device 102 changes location, the service provider 114 may discern that someone operating a mobile device has changed location, but not the identity of that person/device. Without user, time, and dimension information associated with the stored user information, there may be no practical way for the service provider 114 to form a coherent tracking log of the user device 102. The service provider thereby simply can't connect current location to past or future locations of a user based upon reading of user information stored in entropy multiplexing store 116.

Figure 4:
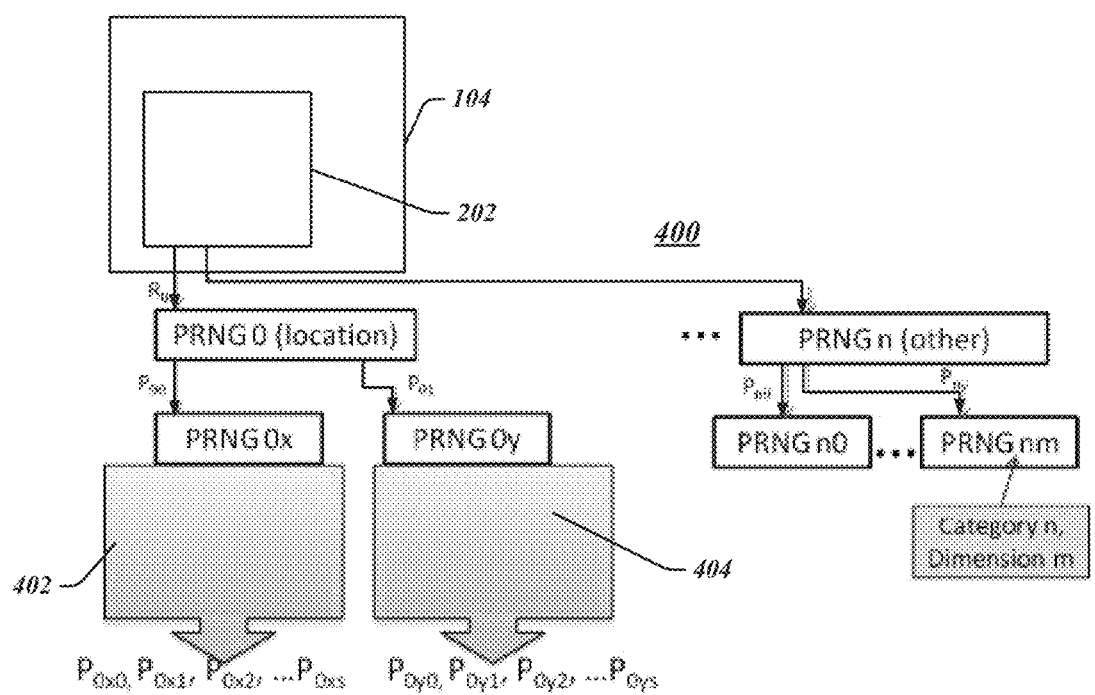
FIG. 4 depicts a further exemplary architecture.

Although in some embodiments EM is employed to store anonymized location records that specify a complete set of location coordinates or dimensions with a given PRN, in other embodiments, a EM employs a set of dimensional sub-PRNGs in which each PRN may be associated with a single dimension. This allows a user to selectively share overall dimension of a location, such as an X,Y pair, or just a single dimension, such as X. FIG. 4 depicts one such architecture 400 in which a base PRNG0 is arranged to generate a PRN seed for each of two dimensions, X and Y. Thus a $P_{00}$ seed is generated to specify the address of an X dimension of a location and a $P_{01}$ seed is generated to specify the address of a Y-dimension of a location. The $P_{00}$ seed is fed to PRNG0$_x$ and a $P_{01}$ seed is fed to the PRNG0$_y$. Each of these pseudo random number generators may then generate a series of PRNs at intervals corresponding to intervals for recording successive location information, such as one second intervals. As illustrated, the PRNG0$_x$ generates output 402 that contains a $P_{0x1}$ followed by $P_{0x2}$ and so forth, while PRNG0$_y$ generates output 404 that contains a $P_{0y1}$ followed by $P_{0y2}$ and so forth.

In various embodiments, in the architecture 400, the pseudo random number generators PRNG0, PRNG0$_x$ and PRNG0$_y$ may employ a common PRNG algorithm. In this manner, a trusted party may be granted access to different levels of location information depending on the PRN seed that the trusted party receives. For example, if the trusted party receives the respective PRN seeds associated with PRNG0$_x$ and PRNG0$_y$ then the trusted party may reconstruct user location records by interrogating the individual location records associated with a X dimension and a Y-dimension of a given location. In one specific example, the trusted party generates $P_{0x1}$ address from the $P_{00}$ seed provided and generates $P_{0y1}$ address from the $P_{01}$ seed provided. Provided that the trusted party is also provided with the PRNG algorithm used by the PRNGs PRNG0$_x$ and PRNG0$_y$ the user may then determine that the $P_{0x1}$ address is related to the $P_{00}$ seed in the same manner as $P_{0y1}$ address is related to the $P_{01}$ seed, that is, the relationship involves the same number of random number generation steps between seed and address. Therefore the trusted party can determine that "X" location information stored in a location record at the $P_{0x1}$ address is related to "Y" location information stored in a location record at the $P_{0y1}$ address, and more particularly, that the X and Y dimensions contained therein in the respective addresses represent the different spatial coordinates of a user device at the same point in time. Together, these two location records specify the actual X-Y position of the user device at a given point in time.

On the other hand, if the trusted party is solely provided with the $P_{00}$ the trusted party may be able to reconstruct an "X-track" that contains a series of X dimensions stored in the $P_{0x1}$ address, the $P_{0x2}$ address, the $P_{0x3}$ address, and so forth. However, the trusted party may have no means to determine associated Y coordinates to pair with X coordinates of the X-track, since the $P_{01}$ seed was not provided.

Figure 5:
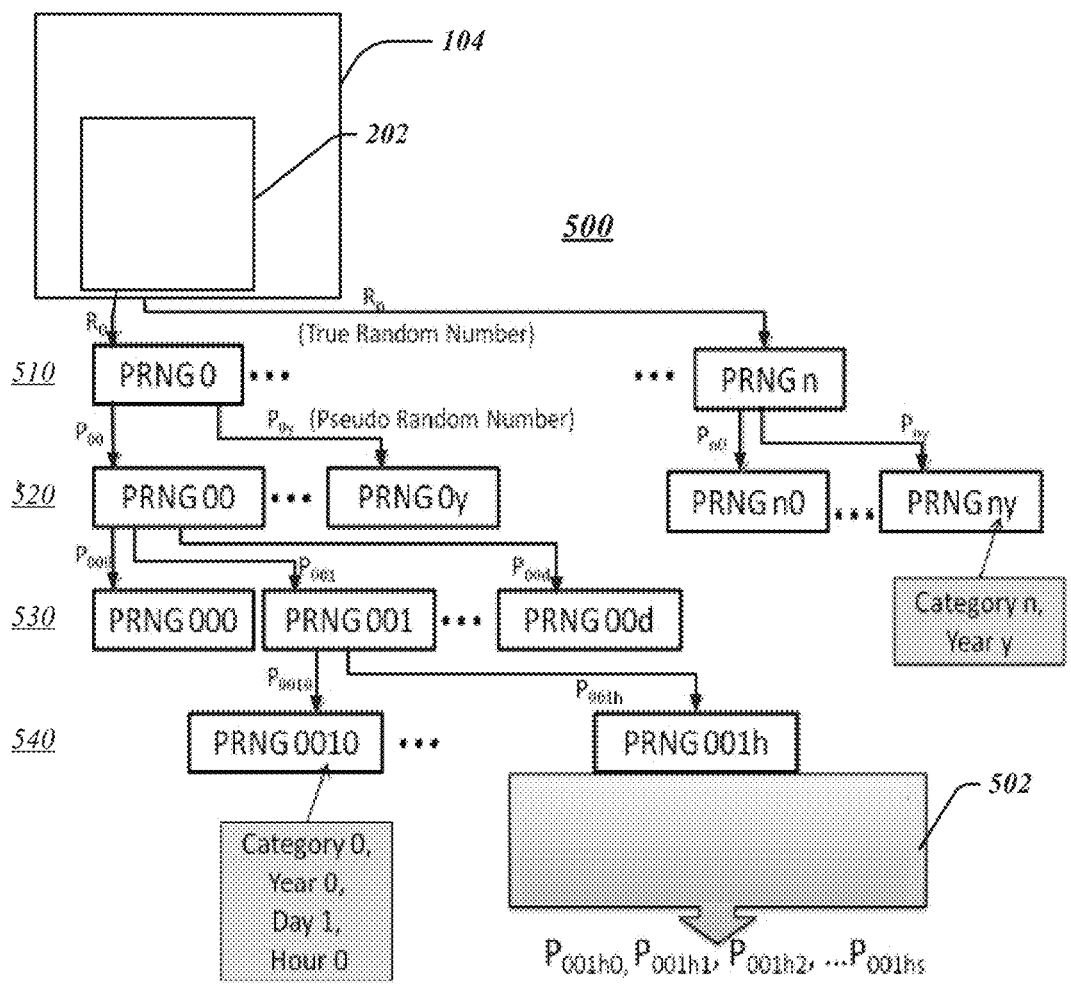
FIG. 5 shows still another exemplary architecture.

In various additional embodiments, EM may be used to time-bound access to user information, meaning to restrict access to user information generated within a time window. In particular, an architecture referred to herein as a "PRNG tree" may be used as the basis of a PRN-generation algorithm such that a user is provided with the ability to share just a portion of user information such as location information that is less than the entire amount of stored location information. In these additional embodiments, time bounded user information may be stored in an entropy multiplexing store in a manner that preserves user anonymity as generally described in the aforementioned embodiments. FIG. 5 depicts an architecture 500 that is arranged in a PRNG tree structure having a series of levels 510, 520, 530, 540 that each have one or more PRNGs. At the upper, category level 510 a series of categories are defined by the true random number seeds $R_0$ to $R_n$ which are sent from the random number generator 202 to respective pseudo random number generators PRNG0 to PRNGn. Each category may represent an isolated context such as location. As illustrated, the PRNG tree structure is such that a random number seed generated for a given level is operative to seed one or more random number sequences at levels below the given level. This may result in generation of multiple parallel random number sequences whose number may increase as the random number generation extends to lower levels in which each given random number of a random number sequence received from a higher level may feed a separate PRNG at a level below. Each separate PRNG, in turn, may generate a new random number sequence in which each random numbers feeds a corresponding PRNG on a lower level.

In the example of FIG. 5, the random number seeds act as category keys in which under a given category key, there exists a PRNG that is seeded by the category key, which produces a new PRN at regular intervals. In the example of FIG. 5, the PRNG0 generates a PRN at yearly intervals, such as $P_{00}$ . . . $P_{0Y}$ to the respective yearly pseudo random number generators PRNG00 . . . PRNG0$_y$ at yearly level 520. Each yearly PRN in turn feeds another nested PRNG located at a level below. As shown, the yearly PRNG00 generates the sequence $P_{000}$, $P_{001}$ . . . $P_{00d}$, . . . which are fed to respective daily PRNG000, PRNG001, . . . PRNG00d located at the daily level 530. As illustrated for one daily PRNG the daily PRNG001 generates the sequence $P_{0010}$ . . . $P_{001h}$ which are received by respective hourly PRNGs. P0010 . . . P001$h$ at hourly level 540. Although not shown, further levels below level 540 which represent shorter time intervals are possible in various embodiments. The nesting process thus continues down to cover shorter and shorter time intervals until PRNs are issued at a most frequent sample rate, which may be the desired sample rate for storing location data.

A result of the use of random number tree structure of FIG. 5 to generate random numbers is that a user may grant access to another party to different portions of user information that is stored in an entropy multiplexing store together with a pseudo random number. If an entity is provided with $R_0$, using the appropriate random number generator algorithm that entity they may recreate PRN's for every second over all time, past, present, and future that are associated with the category of $R_0$, which in this example is the category of pseudo random numbers associated with location records. If an entity merely possesses $P_{001}$, and no PRNs from higher levels, however, the entity can merely generate the PRN's for each second of a single day. By allocating different PRNG seeds, the user thereby restricts access to user location information such that different people can access specific time-bounded portions of the user location information.

In the tree structure provided by the architecture 500, on one or more levels multiple PRNGs may be deployed according to the number of timing entities that are provided within that level. For example, on the daily level 530 up to 365 PRNGs may be provided for each day of a year. On the hourly level 540 up to 24 PRNGs may be provided for each hour of a day. However, fewer PRNGs than 24 may be provided on the hourly level 540 and fewer than 365 PRNGs may be provided on the daily level 530. When a trusted party is to be granted access to time-bound user information, a user device may receive the information, such as a given hour in a given day, and associate the time-bound user information with the appropriate PRN of the PRNG tree for that hour.

Although in various embodiments the PRNGs of the PRNG tree structure of FIG. 5 may all be the same, that is, may all employ the same PRNG algorithm, in other embodiments, different PRNGs may employ different PRNG algorithms. This may provide a user with another level of control over access to user information. In order to communicate more than one PRNG algorithm synchronization between a sourcing entity and consuming entity may be used. For example, if there a first RN and RNG algorithm is established between the entities, then a second PRNG can be negotiated by posting the name of the 2nd algorithm information into the database used to store the user information records, by employing a PRNG that is intended for negotiating a second PRNG. The specifics of which PRNG algorithm, which random number seed, and when the new PRNG are to be deployed may be included, or may be communicated via an out-of-band channel between entities.

While the aforementioned embodiments that employ EM to publish user information do not require encryption to protect a user's identity or to protect the user information from unwanted uses such as location tracking, encryption procedures themselves may be integrated into a PRNG architecture similar to that disclosed above. In particular, the PRNG architecture of an EM system may be extended by creating an additional type of PRNG to manage anonymization of encryption information.

Figure 6:
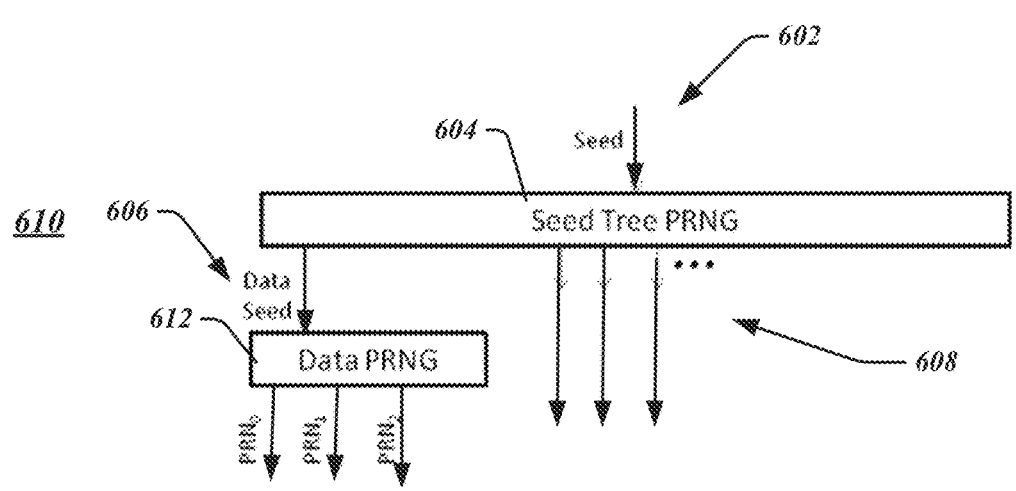
FIG. 6 depicts another exemplary architecture.

One implementation of this is illustrated in FIG. 6. In the architecture 600 of FIG. 6 there is shown a portion of a tree structure architecture than may form a part of the architecture 500 in one example. In this architecture 600 a "Data PRNG" is defined, which may be placed at any node in the PRNG tree structure to act as both a data carrier and a node in the tree structure hierarchy. As shown in FIG. 6, an RN seed 602 is fed to a seed tree PRNG 604 at a level 610, which may represent any node (PRNG) in a tree structure such as the architecture 500. The seed tree PRNG 604 may generate a series of PRNs shown collectively as PRNs 608, where each PRN may act as an address for user information storage, and may seed additional PRNGs at levels below (not shown) as described with respect to FIG. 5. However, it may be desirable to encrypt anonymized user information records associated with a given PRN such as the data seed 602, in order to add another level of information protection. The architecture 600 accomplishes this by arranging the seed tree PRNG 604 to generate a data seed when encryption is to be performed. As shown in FIG. 6, the seed tree PRNG 604 may generate a data seed 606, which is fed to a data PRNG 612.

For purposes of illustration, in one implementation, the seed tree PRNG 604 may correspond to user location information at the first month of a year. The first PRN generated by seed tree PRNG 604, that is, data seed 606, is used to seed the data PRNG 612 while a subsequent PRN 608 is used to further seed a PRNG (not shown) on level 620, which may generate PRNs corresponding to daily information records. The Data PRNG 610 in particular may produce a sequence of values that may be used to encode a stream of information such as a location vector that is sampled at a rate corresponding to the parent PRNG, that is, the monthly rate of the seed tree PRNG 604. As shown in FIG. 6, the data PRNG 612 may generate multiple outputs including an address for the user information record and encryption key information. For example, data PRNG 612 may generate a $PRN_0$ that acts as the address for user information stored at the node represented by data seed 606. A $PRN_1$ output by the PRNG 612 may serve as encryption key and $PRN_2$ output by the PRNG 612 may serve as integrity key for data associated with the seed tree PRNG 604. In a case where the user information associated with data seed 606 is not to be encrypted, the data seed 606 may serve as the direct address for the user information as in the architecture 500.

In some embodiments, the PRNs that are used to generate encryption keys may be used to implement a key refresh policy where a predetermined amount of bytes of ciphertext generation triggers a new PRN value that generates a new encryption key. Conventional key refresh algorithms rely on complex protocols for connecting to the communicating endpoints to agree on a new key. Key refresh is useful because the volume of ciphertext is correlated to known ciphertext attack success rates. A policy that mandates key change after every "X" byes of key usage is easy to apply and has little or no disruption (added latency) to the data flow.

Figure 7A:
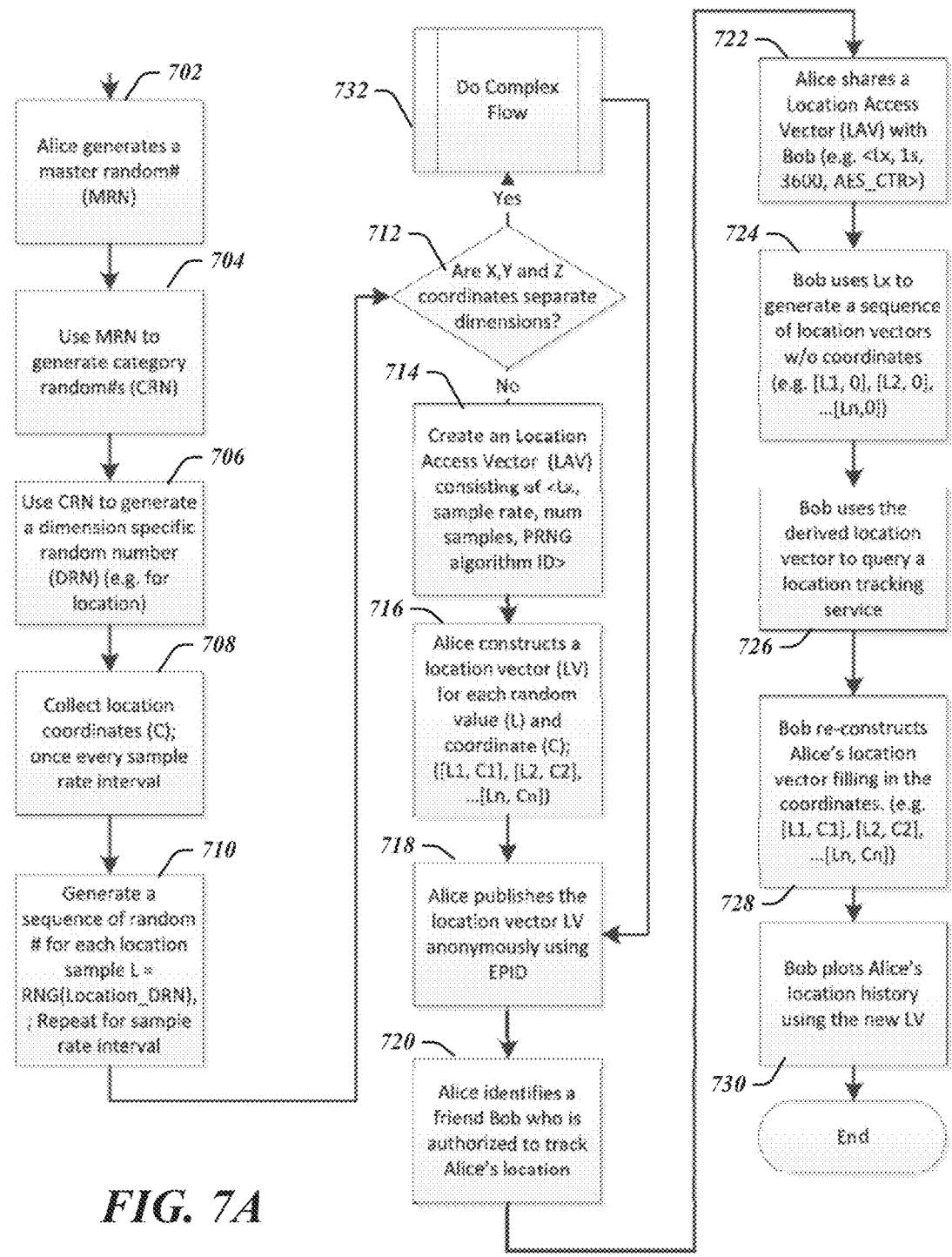
FIGS. 7A-7B depict various operations involved in a scenario of providing access to anonymized user information according to one embodiment.

To further highlight operation principles and advantages afforded by EM of the present embodiments, FIG. 7A illustrates exemplary operations involved in one use scenario of entropy multiplexing consistent with the present embodiments. In the use scenario illustrated, a user (Alice) stores location information using EM procedures and subsequently provides access to a friend (Bob) to the location data that includes a random number seed and algorithm for generating random numbers that represent the address of the stored location information.

In operation 702, a master random number is generated, for example by a true random number generator located in Alice's PC. At operation 704, category random numbers are generated using a random number generator based upon the master random number. At operation 706, a dimension specific random number (DRN) is generated from a category random number. The dimension specific random number may be a random number for location records.

In the operation 708, location coordinates (C) associated with a user device are collected at regular instances, termed a sample rate interval, such as once every minute. The location coordinates may be collected from Alice's mobile device for example.

In operation 710 a sequence of random numbers is generated in which a random number is generated for each location sample, that is, for each set of location coordinates collected for the user device at the sample rate interval. The random number L is generated by the operation of a random number generator (RNG) such as a pseudo random number generator, upon the DRN previously created. This operation is repeated every sample rate interval so that successive random numbers are generated by operation of the RNG upon a previous random number.

In different variants of the present embodiments the coordinates of a given location, such as X, Y, and Z coordinates, may be stored as a single location dimension, or may be stored separately as multiple location dimensions. In operation 712, if the X-Y, and Z coordinates of a given location coordinate (C) are not stored separately, the operation 714 takes place. I In the operation 714, a location access vector (LAV) is created. This entity is used to supply trusted parties or others with information that allows user information that has been anonymized and stored by EM procedures to be accessed and correlated in a useful fashion by the trusted party. As illustrated, the LAV includes a random number Lx, an indication of sampling rate for the stored user information, an indication of the number of samples of user information stored, and a PRNG algorithm ID. The random number Lx acts as a seed to generate the other random number addresses for the user location information records. The number of samples indicates to a trusted party how many potential user location information records are stored related to the LAV. The PRNG algorithm ID identifies the PRNG to be used by the trusted party to regenerate the PRN addresses that are associated with the user location information records. Accordingly, in order to reconstruct all of the addresses of the user location information records, a trusted party may run the identified PRNG starting with Lx for a number of operations corresponding to the number of samples indicated in the LAV. The sample rate indicates to the user how frequently the user information in the user location information records was collected so that the trusted party may recreate an accurate track of the user location after recovery of the actual location data (C) stored in the user location information records.

In operation 716, the user device (Alice) constructs a location vector LV for each location coordinate C and associated random number L that is generated in operation 714. For example, a first LV may be (L1, C1) where L1 is the first random number of the random number sequence generated in operation 710, and C1 is the first location coordinate of various locations sampled by the user device. Additional location vectors are (L2, C2), L3, C3), . . . (Ln, Cn).

In operation 718, the user (Alice) publishes the location vector LV anonymously. For example, the LV may be stored as a user information record in an entropy multiplexing store managed by a service provider as discussed above. The LV may be published using a network address masking and enhanced privacy ID (EPID) protocol, which is a conventional cryptographic protocol that may prevent Alice's identity from being revealed when the LV is published.

In operation 720 Alice identifies a friend Bob who is authorized to track Alice's location. In order to provide access for Bob to her location information, in operation 722 Alice sends to Bob the LAV created in operation 714. In some implementations, the LAV may be distributed to Bob or other trusted parties in a secure manner over a secure channel. For example, the secure channel may be a trusted execution environment channel, where the endpoints of the trusted execution environment channel are Trusted Execution Environment (TEE) technologies, such as Intel® Manageability Engine, Intel® Converged Security Engine, Intel® Software Guard Extensions, virtual machine environments, Apple® Secure Enclaves (Apple is a trademark of Apple, Inc.) and ARM® Trust Zone® (trademarks of ARM Holdings).

In operation 724 Bob generates a series of "empty" location vectors based upon the Lx value and PRNG ID provided in the LAV. The empty location vectors represent the sequence of random numbers of the location vector LV of operation 716. The empty location vectors may be, represented as, for example, (L1, 0), L2, 0), L3,), and so forth.

In the operation 726 Bob then employs the empty location vectors to query a database (entropy multiplexing store) of a service provider for Alice that stores her location information. The empty location vectors provide Bob with the address of the user location information records that Alice has granted access to. This allows Bob to access all the location coordinates C that Alice's mobile device has stored for this scenario. In the operation 728 Bob reconstructs the LV created by Alice in operation 716 by filing in the location coordinates C for each random number L.

In operation 730 Bob generates a location track that plots Alice's location history from the reconstructed LV.

Although the sequence of operations shown in FIG. 7A shows an example in which an LAV is shared with a trusted party after the creation of location vector information LV, in other embodiments, an LAV may be constructed and shared prior to the creation of an LV. In other words, the location access information for records may be created before the location values are recorded and stored. This highlights a feature of the present embodiments, in which the PRNG seeds and related PRNs can be calculated before their use as information record addresses.

If in operation 712 X, Y, and Z coordinates are stored as separate dimensions a complex operation 732 is performed.

Figure 7B:
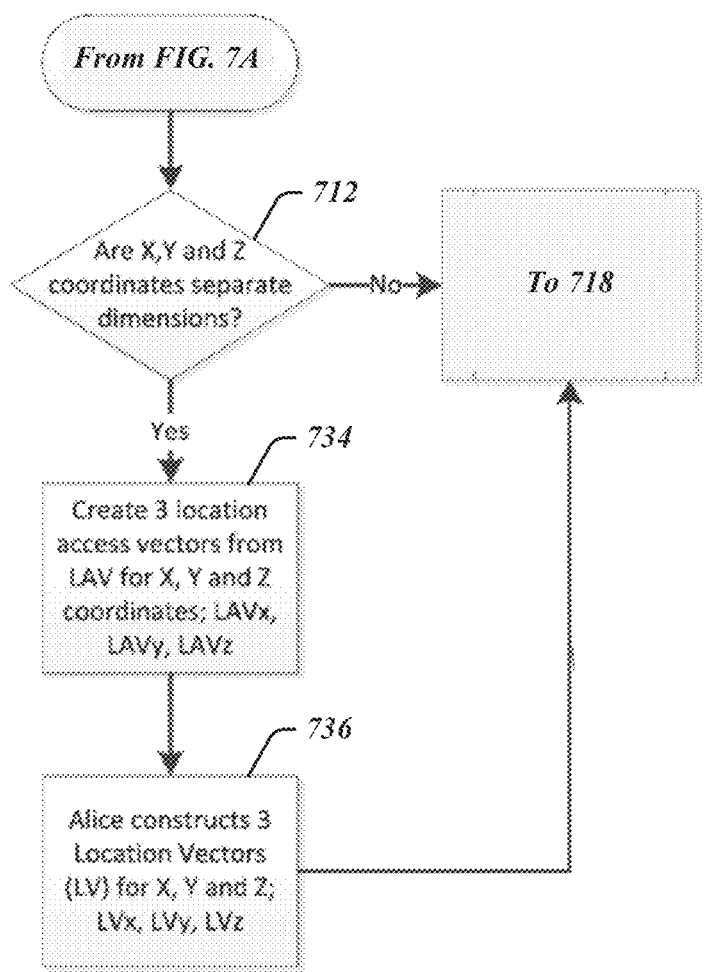

Turning now to FIG. 7B, in operation 734 three location access vectors LAVx, LAVy, and LAVz are created for the respective location coordinates X, Y, and Z. In operation 736, three location vectors LVx, LVy, and LVz are created for the respective X, Y, and Z dimensions. The subsequent operations then proceed from operation 718 in FIG. 7A. However, in this case, Alice has the option of providing Bob with one, two, or three of the location access vectors LAVx, LAVy, and LAVz depending upon whether all coordinates of her location are to be revealed as discussed above.

In the use scenario of FIGS. 7A and 7B, a non-trusted party or semi-trusted party, including a service provider that stores the anonymized user location information records, is not provided with the location access vectors LAV. Although the service provider may be able to view the location data, that is the location coordinates (C) in the anonymized user location information records, without knowledge of the location access vectors, the service provider cannot determine that the various location coordinates C1, C2, . . . C3 correspond to the same user device. Nor can the service provider determine the order of the various location coordinates or the interval between recordings of the location coordinates.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
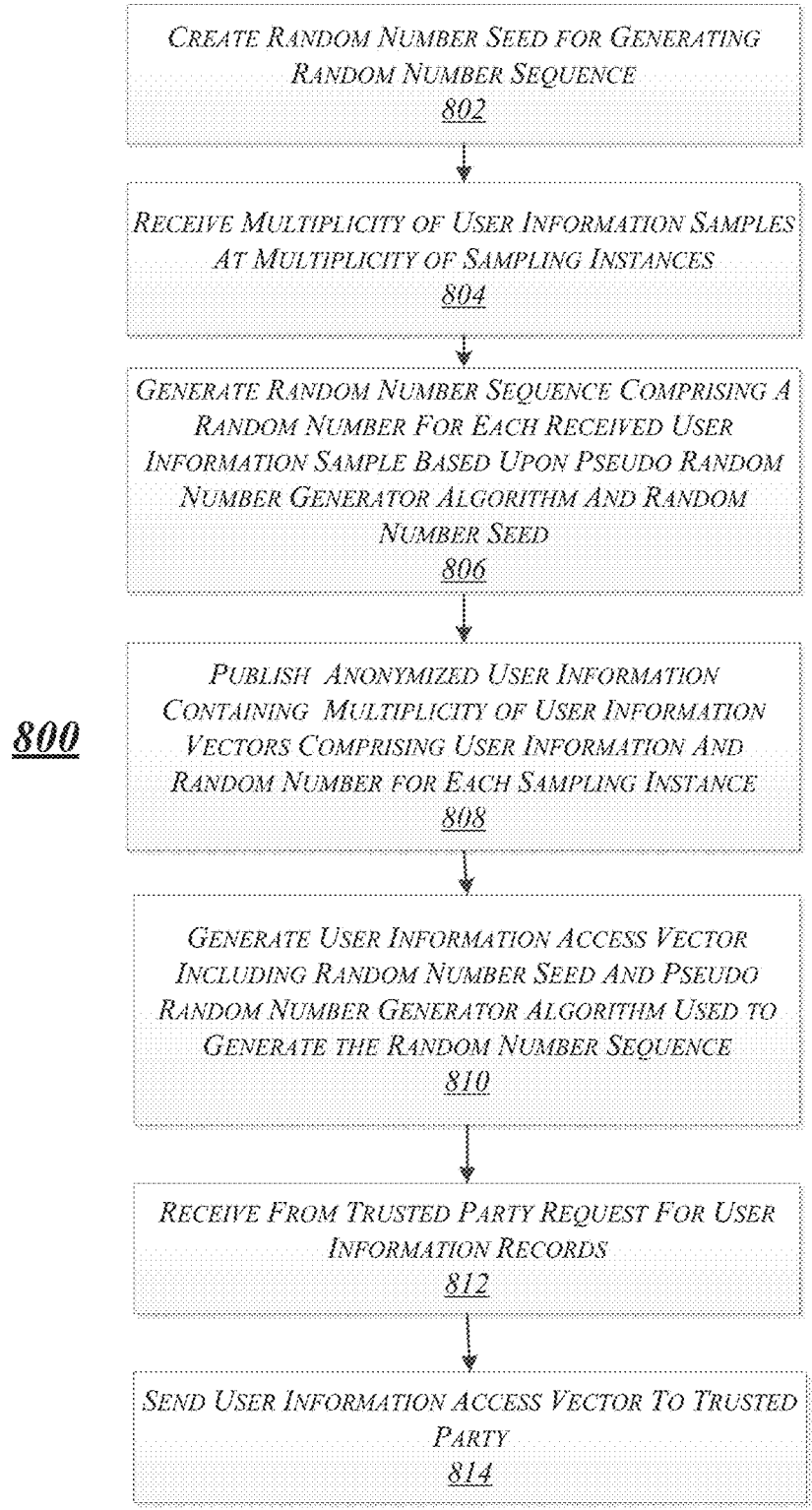
FIG. 8 depicts an exemplary first logic flow.

FIG. 8 illustrates an exemplary first logic flow 800. At block 802, a random number seed is created for generating a random number sequence. The random number seed may be pseudo random number that generates a series of successive random numbers based upon a pseudo random number generator algorithm.

At block 804, a multiplicity of user information samples are received at a multiplicity of sampling instances. The user information samples may be user information generated from a mobile device, such as location information of the mobile device that is generated at regular intervals.

At block 806 a random number sequence is generated that contains a random number for each received user information sample of the received user information samples. The random number is based upon the pseudo random number generator algorithm and random number seed.

At the block 808, anonymized user information is published that contains a multiplicity of user information vectors, where the user information vectors contain a user information sample and random number generated by the pseudo random number generator algorithm.

At block 810, a user information access vector is generated that contains the random number seed, and pseudo random number generator algorithm used to generate the random number sequence.

At block 812, a request for user information records is received from a trusted party. At block 814, the user information access vector is sent to the trusted party.

Figure 9:
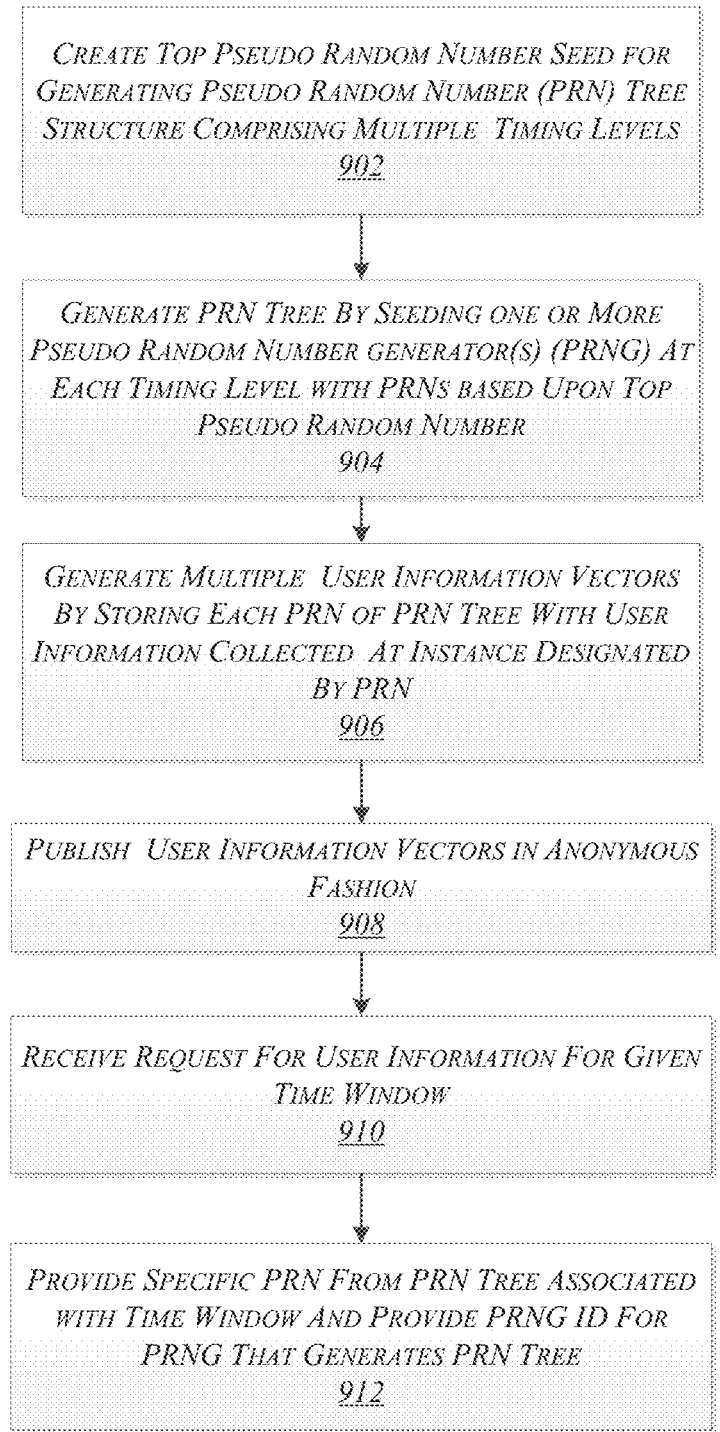
FIG. 9 depicts an exemplary second logic flow.

FIG. 9 illustrates an exemplary second logic flow 900. At block 902, a top pseudo random number seed is created for generating a pseudo random number (PRN) tree structure that contains multiple timing levels. The multiple timing levels may be for example, yearly, daily, hourly schedules.

In block 904, a PRN tree is created by seeding one or more pseudo random number generators (PRNG) at each timing level with PRNs based upon the next higher level to the each timing level.

At block 906 multiple user information vectors are generated by storing each PRN of the PRN tree with user information collected at instances designated by each given PRN.

At block 908 the information vectors are published in an anonymous fashion.

At block 910 a request for user information is received for a given time window. At block 912, a specific PRN from the PRN tree is provided that is associated with the time window as well as a PRNG ID for the PRNG that generated the PRN tree.

At block 910 a request for user information is received for a given time window. At block 912, one or more PRNs from the PRN tree are provided that are associated with the time window as well as a PRNG ID for the PRNG that generated the PRN tree.

In summary, the present embodiments of entropy multiplexing facilitate the anonymization of user information without the requirement of encryption. In various implementations, this allows a single "stream" of user information such as location track information to be fed to a service provider such as a location tracking service without the service provider being able to easily track the user that submits the information. A practical consequence of the EM procedures of the present embodiments is that resistance to unauthorized tracking improves as the submitter (user) base increases and as the size of the tracking data increases. The EM procedures disclosed herein also allow the submitter can grant access to user information to trusted parties of the user's choosing. Moreover, access can be granted that occurs in the future as well as to historical and current occurrences.

Another advantage afforded by the various EM embodiments is that implementing a random number generator (e.g., DRNG) in user device hardware allows the service provider such as a location service to scale to very large size by offloading content indexing to submitter (user) nodes, while still retaining database integrity as opposed to implementing PRNGs only in software.

Moreover, in various embodiments the use of user hardware ensures user privacy is enforceable without having to trust the service provider by employing user device based technology that incorporates EPID and DRNG.

Further advantages of the present embodiments include the ability to update user information such as location track information using EPID so that the user is not identified during the update process.

Moreover the use of DRNG to generate addresses of user information in the present embodiments may ensure that user information when published to a database is scattered sufficiently to protect privacy.

A further advantage afforded by various embodiments is that the user can grant access to herself (e.g., to her other devices) by distributing the appropriate PRN seeds and PRNG to designated user devices. This may be particularly useful for scenarios in which user location information is to be made available to all user devices including those that do not contain GPS or other location sensors.

In addition, the present embodiments provide a combination of one or more of the following features: a system for storing a sequence of personal information records on a server without explicit user accounts, where the system storing individual records may be enormous ($2^{128}$ or larger) sparse array; a method for calculating a sequence of time-based random indexes into the sparse array using a nested hierarchy of pseudo random number generators and a root seed; a method for client systems to communicate and store individual records on the server at pseudo random indexes within said sparse array; a method to convey a seed value to another party to generate a time-bounded pseudo random number sequence corresponding to a time-bounded sequence of personal records stored on the server; a method to convey a lower level seed value to another party corresponding to a lesser time interval and, therefore, a shorter sequence of time-bounded records; a method for retrieval of a time-bounded sequence of records from a server corresponding to those stored at the above-described sequence of pseudo random indexes; A method to decompose dimensions of a given piece of personal information (e.g., parts of a physical address), where storing records for each dimension at indexes generated by different root seeds; and a method to enable encryption and authentication of records using portions of a nested pseudo random number sequence.

Figure 10:
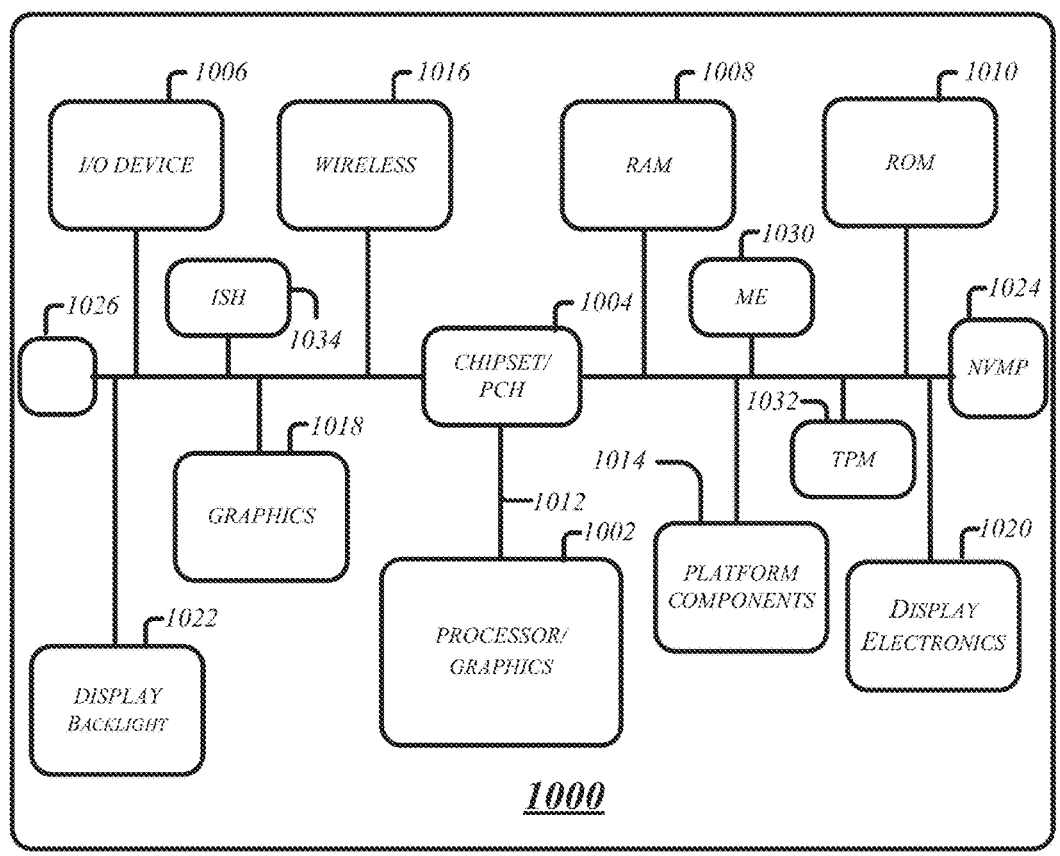
FIG. 10 illustrates an exemplary platform.

FIG. 10 is a diagram of an exemplary system embodiment and in particular, FIG. 10 is a diagram showing a system 1000, which may include various elements. For instance, FIG. 10 shows that system (platform) 1000 may include a processor/graphics core, termed herein processor 1002, a chipset/platform control hub (PCH), termed herein chipset 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 1016 and graphics device 1018, non-volatile memory port (NVMP) 1024, and antenna 1026. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

The system 1000 may further include a processor termed a Manageability Engine (ME) 1030 and optionally may include a Trusted Platform Module (TPM) 1032 and an Integrated Sensor Hub (ISH) 1034. In some implementations a DRNG circuit may be integrated into one or more of the ME 1030, TPM 1032, ISH 1034, and processor 1002. In addition, in the system 1000, a DRNG circuit may be integrated into one or more of the ME 1030, ISH 1034 of processor 1002.

Figure 11:
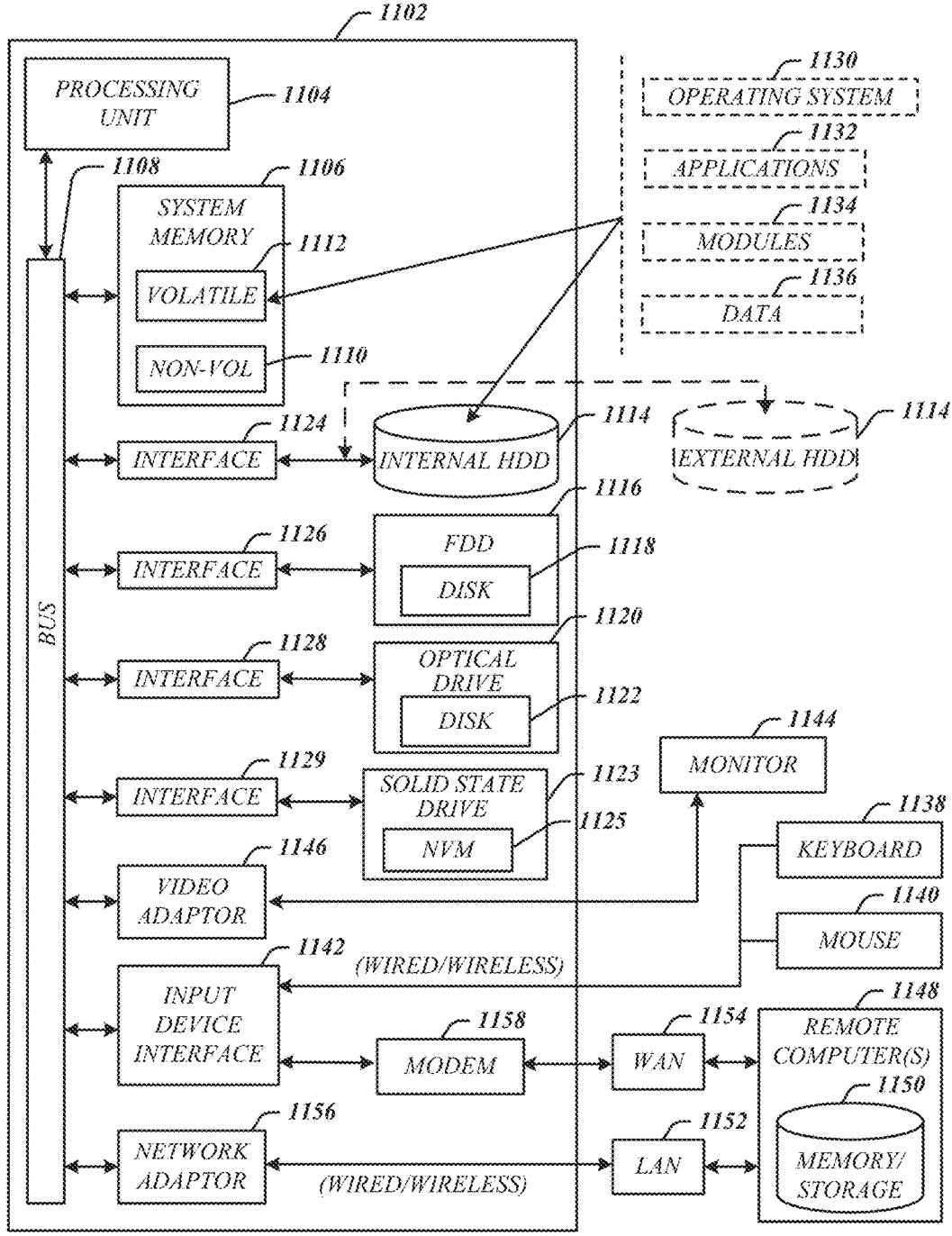
FIG. 11 illustrates one system embodiment.

FIG. 11 illustrates an embodiment of an exemplary computing architecture 1100 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi-processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. In addition to the monitor 1144, a computer typically includes the peripheral output devices, such as speakers, printers, and so forth. The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The following examples pertain to further embodiments.

In example 1, an apparatus for anonymizing user information may include an interface to receive a multiplicity of user information samples at a respective multiplicity of instances, a processor circuit; and an entropy multiplexer for execution on the processor circuit to generate a pseudo random number based upon a pseudo random number seed and pseudo random number generator algorithm for each user information sample of the multiplicity of user information samples and to generate a user information record that contains the pseudo random number and user information sample.

In example 2, the entropy multiplexer of example 1 may be for execution on the processor circuit to generate a user information vector that includes a multiplicity of user information records and respective pseudo random numbers.

In example 3, the multiplicity of user information samples of any of the examples 1-2 may include location information for a user device.

In example 4, the entropy multiplexer of any of the examples 1-3 may include one or more pseudo random number generators (PRNG), where each pseudo random number generator is for execution on the processor circuit to generate a sequence of one or more pseudo random numbers based upon a pseudo random number seed.

In example 5, the entropy multiplexer of any on examples 1-4 may include a random number generator tree containing a plurality of levels, where the random number generator tree is for execution on the processor circuit to generate one or more random numbers at each level of the plurality of levels, wherein a first random number generated by a first random number generator on a first level is to feed a second random number generator at a second level lower than the first level, the second random number generator to generate a random number sequence comprising two or more random numbers.

In example 6, the first level for any of the examples 1-5 may include a multiplicity of random number generators fed by a corresponding multiplicity of first random number seeds, the first random number seeds corresponding to information samples collected at a series of first instances in which successive first instances are separated by a first interval, and the second level for any of the examples 1-5 may optionally include a multiplicity of random number generators fed by a corresponding multiplicity of second random number seeds, the second random number seeds corresponding to information samples collected at a series of second instances in which successive second instances are separated by a second interval less than the first interval.

In example 7, the entropy multiplexer of any of the examples 1-6 may be for execution on the processor circuit to generate a user information access vector that specifies an algorithm to generate the pseudo random number.

In example 8, the user information samples of any of the examples 1-7 may include location information, and the entropy multiplexer may optionally be for execution on the processor circuit to generate a location vector for each user information sample that specifies a set of location dimensions and pseudo random number associated with the each user information sample.

In example 9, the entropy multiplexer of any of examples 1-8 may be for execution on the processor circuit to publish the user information vector anonymously using network address masking.

In example 10, the entropy multiplexer of any of examples 1-9 may be for execution on the processor circuit to distribute the user information access vector according to a trusted execution environment protocol.

In example 11, the entropy multiplexer of any of examples 1-10 may be for execution on the processor circuit to partition the set of location dimensions into two or more location sub-dimensions that are each associated with a respective pseudo random number.

In example 12, the entropy multiplexer of any of examples 1-11 may be for execution on the processor circuit to, in at least one level, a data PRNG fed by a data seed, the data PRNG to generate a first pseudo random number as an address of user information associated with the data seed; and to generate a second pseudo random number to serve as an encryption key for user information.

In example 13, at least one computer-readable storage medium comprises instructions that, when executed, cause a system to generate, responsive to receipt of a multiplicity of user information samples, a pseudo random number based upon a pseudo random number seed and pseudo random number generator algorithm for each user information sample of the multiplicity of user information samples, and to generate a user information record that contains the pseudo random number and user information sample.

In example 14, the at least one computer-readable storage medium of example 13 may optionally include instructions that, when executed, cause a system to generate a user information vector that includes a multiplicity of user information records, each user information record comprising a user information sample and respective pseudo random number.

In example 15, the multiplicity of user information samples of any of the examples 13-14 may include location information for a user device.

In example 16, the at least one computer-readable storage medium of example 13-15 may optionally include instructions that, when executed, cause a system to generate a sequence of one or more pseudo random numbers based upon a pseudo random number seed.

In example 17, the at least one computer-readable storage medium of example 13-16 may optionally include instructions that, when executed, cause a system to generate one or more random numbers at each level of a plurality of levels, wherein a first random number generated by a first random number generator on a first level is to feed a second random number generator at a second level lower than the first level, the second random number generator to generate a random number sequence comprising two or more random numbers.

In example 18, the at least one computer-readable storage medium of example 13-17 may optionally include instructions that, when executed, cause a system to feed a multiplicity of first random number seeds to the first level, the first random number seeds corresponding to information samples collected at a series of first instances in which successive first instances are separated by a first interval, and to feed a multiplicity of second random number seeds to the second level, the second random number seeds corresponding to information samples collected at a series of second instances in which successive second instances are separated by a second interval less than the first interval.

In example 19, the at least one computer-readable storage medium of example 13-18 may optionally include instructions that, when executed, cause a system to generate a user information access vector that specifies an algorithm to generate the pseudo random number.

In example 20, the at least one computer-readable storage medium of example 13-19 may optionally include instructions that, when executed, cause a system to generate a location vector for each user information sample that specifies a set of location dimensions and pseudo random number associated with the each user information sample.

In example 21, the at least one computer-readable storage medium of example 13-20 may optionally include instructions that, when executed, cause a system to partition the set of location dimensions into two or more location sub-dimensions that are each associated with a respective pseudo random number.

In example 22, the at least one computer-readable storage medium of example 13-21 may optionally include instructions that, when executed, cause a system to generate in at least one level, a data PRNG fed by a data seed, the data PRNG to generate: a first pseudo random number as an address of user information associated with the data seed; and a second pseudo random number to serve as an encryption key for user information.

Example 23 is a computer implemented method to randomize user information, comprising receiving a multiplicity of user information samples at a respective multiplicity of instances a processor circuit; receiving a random number seed and pseudo random number generator algorithm; generating a pseudo random number based upon the pseudo random number seed and pseudo random number generator algorithm for each user information sample of the multiplicity of user information samples, and generating a user information record that contains the pseudo random number and user information sample.

In example 24, the computer implemented method of example 23 includes generating a user information vector that includes a multiplicity of user information records, each user information record comprising a user information sample and respective pseudo random number.

In example 25, the computer implemented method of any of the examples 23-24 may include publishing the user information vector anonymously using network address masking.

In example 26, the user information samples of any of the examples 23-25 may include location information, and the computer implemented method of any of the examples 23-25 may optionally include generating a location vector for each user information sample that specifies a set of location dimensions and pseudo random number associated with the each user information sample.

In example 27, the computer implemented method of any of the examples 23-26 may include generating a sequence of one or more pseudo random numbers based upon a pseudo random number seed.

In example 28, the computer implemented method of any of the examples 23-27 may include generating a user information access vector that specifies an algorithm to generate the pseudo random number.

In example 29, the computer implemented method of any of the examples 23-28 may include distributing the user information access vector according to a trusted execution environment protocol.

In example 30, the computer implemented method of any of the examples 23-29 may include partitioning the set of location dimensions into two or more location sub-dimensions that are each associated with a respective pseudo random number.

In example 31, the computer implemented method of any of the examples 23-30 may include generating a first random number on a first level; feeding the random number to a random number generator at a second level lower than the first level; and generating a random number sequence comprising two or more random numbers, each number of the two or more random numbers to seed a respective random number sequence.

In example 32, the computer implemented method of any of the examples 23-31 may include feeding a multiplicity of first random number seeds to a multiplicity of first random number generators on the first level, the first random number seeds corresponding to information samples collected at a series of first instances in which successive first instances are separated by a first interval; and feeding a multiplicity of second random number seeds to a multiplicity of second random number generators on the second level, the second random number seeds corresponding to information samples collected at a series of second instances in which successive second instances are separated by a second interval less than the first interval.

In example 33, the computer implemented method of any of the examples 23-32 may include generating, in at least one level, a data PRNG fed by a data seed, the data PRNG to generate a first pseudo random number as an address of user information associated with the data seed; and a second pseudo random number to serve as an encryption key for user information.

Example 34 is an apparatus to anonymize user data comprising means to: receive a multiplicity of user information samples at a respective multiplicity of instances a processor circuit; to receive a random number seed and pseudo random number generator algorithm; to generate a pseudo random number based upon the pseudo random number seed and pseudo random number generator algorithm for each user information sample of the multiplicity of user information samples, and to generate a user information record that contains the pseudo random number and user information sample.

In example 35, the apparatus of example 34 may optionally include means to generate a user information vector that includes a multiplicity of user information records, each user information record comprising a user information sample and respective pseudo random number.

In example 36, the apparatus of any of examples 34-35 may include means to publish the user information vector anonymously using network address masking.

In example 37, the user information samples of any of examples 34-36 may include location information, the apparatus comprising means to generate a location vector for each user information sample that specifies a set of location dimensions and pseudo random number associated with the each user information sample.

In example 38, the apparatus of any of examples 34-37 may include means to generate a sequence of one or more pseudo random numbers based upon a pseudo random number seed.

In example 39, the apparatus of any of examples 34-38 may include means to generate a user information access vector that specifies an algorithm to generate the pseudo random number.

In example 40, the apparatus of any of examples 34-39 may include means to distribute the user information access vector according to a trusted execution environment protocol.

In example 41, the apparatus of any of examples 34-40 may include means to partition the set of location dimensions into two or more location sub-dimensions that are each associated with a respective pseudo random number.

In example 42, the apparatus of any of examples 34-41 may include means to generate a first random number on a first level; to feed the random number to a random number generator at a second level lower than the first level; and to generate a random number sequence comprising two or more random numbers, each number of the two or more random numbers to seed a respective random number sequence.

In example 43, the apparatus of any of examples 34-42 may include means to feed a multiplicity of first random number seeds to a multiplicity of first random number generators on the first level, the first random number seeds corresponding to information samples collected at a series of first instances in which successive first instances are separated by a first interval; and to feed a multiplicity of second random number seeds to a multiplicity of second random number generators on the second level, the second random number seeds corresponding to information samples collected at a series of second instances in which successive second instances are separated by a second interval less than the first interval.

In example 44, the apparatus of any of examples 34-43 may include means to generate, in at least one level: a data PRNG fed by a data seed, the data PRNG to generate a first pseudo random number as an address of user information associated with the data seed; and a second pseudo random number to serve as an encryption key for user information.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus for anonymizing user information, comprising:
   an interface to receive a multiplicity of user information samples at a respective multiplicity of instances;
   a processor circuit coupled to the interface; and
   an entropy multiplexer for execution on the processor circuit to generate a pseudo random number based upon a pseudo random number seed and pseudo random number generator algorithm for each user information sample of the multiplicity of user information samples, to generate a user information record that contains the pseudo random number and user information sample, and generate a user information vector that includes a multiplicity of user information records and respective pseudo random numbers.

2. The apparatus of claim 1, the multiplicity of user information samples comprising location information for a user device.

3. The apparatus of claim 1, the entropy multiplexer comprising one or more pseudo random number generators (PRNG), each pseudo random number generator for execution on the processor circuit to generate a sequence of one or more pseudo random numbers based upon a pseudo random number seed.

4. The apparatus of claim 1, the entropy multiplexer comprising a random number generator tree containing a plurality of levels, the random number generator tree for execution on the processor circuit to generate one or more random numbers at each level of the plurality of levels, wherein a first random number generated by a first random number generator on a first level is to feed a second random number generator at a second level lower than the first level, the second random number generator to generate a random number sequence comprising two or more random numbers.

5. The apparatus of claim 4,
   the first level including a multiplicity of random number generators fed by a corresponding multiplicity of first random number seeds, the first random number seeds corresponding to information samples collected at a series of first instances in which successive first instances are separated by a first interval, and
   the second level including a multiplicity of random number generators fed by a corresponding multiplicity of second random number seeds, the second random number seeds corresponding to information samples collected at a series of second instances in which successive second instances are separated by a second interval less than the first interval.

6. The apparatus of claim 1, the entropy multiplexer for execution on the processor circuit to generate a user information access vector that specifies an algorithm to generate the pseudo random number.

7. The apparatus of claim 1, the user information samples comprising location information, the entropy multiplexer for execution on the processor circuit to generate a location vector for each user information sample that specifies a set of location dimensions and pseudo random number associated with the each user information sample.

8. The apparatus of claim 1, the entropy multiplexer for execution on the processor circuit to publish the user information vector anonymously using network address masking.

9. The apparatus of claim 4, the entropy multiplexer for execution on the processor circuit to generate, in at least one level, a data PRNG fed by a data seed, the data PRNG to generate:
 a first pseudo random number as an address of user information associated with the data seed; and
 a second pseudo random number to serve as an encryption key for user information.

10. At least one non-transitory computer-readable storage medium comprising instructions that, when executed, cause a system to generate, responsive to receipt of a multiplicity of user information samples, a pseudo random number based upon a pseudo random number seed and pseudo random number generator algorithm for each user information sample of the multiplicity of user information samples, to generate a user information record that contains the pseudo random number and user information sample, and generate a user information vector that includes a multiplicity of user information records, each user information record comprising a user information sample and respective pseudo random number.

11. The at least one non-transitory computer-readable storage medium of claim 10, the multiplicity of user information samples comprising location information for a user device.

12. The at least one non-transitory computer-readable storage medium of claim 10, comprising instructions that, when executed, cause a system to generate a sequence of one or more pseudo random numbers based upon a pseudo random number seed.

13. The at least one non-transitory computer-readable storage medium of claim 10, comprising instructions that, when executed, cause a system to generate one or more random numbers at each level of a plurality of levels, wherein a first random number generated by a first random number generator on a first level is to feed a second random number generator at a second level lower than the first level, the second random number generator to generate a random number sequence comprising two or more random numbers.

14. The at least one non-transitory computer-readable storage medium of claim 13, comprising instructions that, when executed, cause a system to feed a multiplicity of first random number seeds to the first level, the first random number seeds corresponding to information samples collected at a series of first instances in which successive first instances are separated by a first interval, and
 to feed a multiplicity of second random number seeds to the second level, the second random number seeds corresponding to information samples collected at a series of second instances in which successive second instances are separated by a second interval less than the first interval.

15. The at least one non-transitory computer-readable storage medium of claim 10, comprising instructions that, when executed, cause a system to generate a user information access vector that specifies an algorithm to generate the pseudo random number.

16. The at least one non-transitory computer-readable storage medium of claim 10, comprising instructions that, when executed, cause a system to generate a location vector for each user information sample that specifies a set of location dimensions and pseudo random number associated with the each user information sample.

17. The at least one non-transitory computer-readable storage medium of claim 16, comprising instructions that, when executed, cause a system to partition the set of location dimensions into two or more location sub-dimensions that are each associated with a respective pseudo random number.

18. A computer implemented method to randomize user information, comprising:
 receiving a multiplicity of user information samples at a respective multiplicity of instances;
 receiving a random number seed and pseudo random number generator algorithm;
 generating, at a processor circuit, a pseudo random number based upon the pseudo random number seed and pseudo random number generator algorithm for each user information sample of the multiplicity of user information samples;
 generating a user information record that contains the pseudo random number and user information sample;
 generating a user information vector that includes a multiplicity of user information records, each user information record comprising a user information sample and respective pseudo random number; and
 storing the user information vector in a computer searchable entropy multiplexing store associated with a non-transitory computer-readable storage medium.

19. The computer implemented method of claim 18, the user information samples comprising location information, the method comprising generating a location vector for each user information sample that specifies a set of location dimensions and pseudo random number associated with the each user information sample.

20. The computer implemented method of claim 18, comprising generating a sequence of one or more pseudo random numbers based upon a pseudo random number seed.

21. The computer implemented method of claim 18, comprising generating a user information access vector that specifies an algorithm to generate the pseudo random number.

22. The computer implemented method of claim 18, comprising:
 generating a first random number on a first level;
 feeding the random number to a random number generator at a second level lower than the first level; and
 generating a random number sequence comprising two or more random numbers, each number of the two or more random numbers to seed a respective random number sequence.

\* \* \* \* \*